March 19, 1963 J. AURICOSTE 3,082,410

LOAD FEEDING DEVICES

Filed April 30, 1958

Inventor
Jean Auricoste
By Ralph B. Stewart
attorney 3,082,410

LOAD FEEDING DEVICES

Jean Auricoste, Paris, France, assignor to Societe d'Electronique et d'Automatisme, Courbevoie, Seine, France Filed Apr. 30, 1958, Ser. No. 731,941
Claims priority, application France May 2, 1957
3 Claims. (Cl. 340—174)

The present invention concerns improvements in binary coded information handling systems of the type using magnetic cores of a material having a substantially rectangular hysteresis loop.

An object of the invention is to provide in such a system an output arrangement enabling the feeding of a load which requires a continuous current for the operation thereof, the output arrangement being controlled from the pulses issuing from the said system wherein a data processing operation results in the output of a single pulse for each such operation.

According to the invention, this output arrangement is mainly characterized in that it includes the combination of a one-digit magnetic-core store, means for storing therein any output pulse for the processing system and at least one magnetic amplifier stage the output of which is adapted to feed the load with the required continuous current, the said one-digit store and the said magnetic amplifier stage being of the same supply and control characteristic as the magnetic-core circuits of the said processing system.

The invention will be fully described with reference to the accompanying drawings, wherein.

Figure 1:
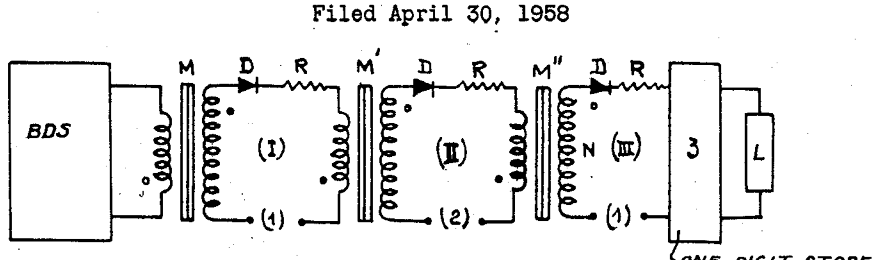
FIG. 1 shows a circuit arrangement connecting the output of a binary data processing system to a continuous-current load to be energized each time an output pulse issues from the processing system.

Referring to FIG. 1, the reference BDS represents the binary data handling and processing system, as a whole, which, at the end of certain processing operations, the actual character of which does not actually concern the invention, will deliver at its output a single electrical pulse. This pulse is due to actuate or activate a load L but this load is of a character requiring a continuous supply of electrical current, comprising for instance an electrical motor. The decision pulse from BDS must consequently be converted into such an electrical current and this is effected by an appropriate converter unit 3 to which the decision pulse is supplied through a cascade of magnetic core stages; for instance in the example given there are provided three saturable magnetic cores M, M' and M'', each of which has a substantially rectangular hysteresis loop. It may be considered that these cascaded stages actually are the output stages of the system BDS but they have been separately shown in order to better define the character of the processing system involved in the invention.

Each one of the cores is provided with an input winding of N*i* turns and an output winding of N*o* turns, with N*o* higher than N*i*. The magnetic cores are interconnected by means of interconnection networks (I), (II) and a similar output network (III) to the input of the converter unit 3 which, as will clearly appear hereinafter, presents the same input arrangement as any one of the saturable magnetic core stages of the cascade, since this network (III) will actually be an input control circuit of a one-digit store, see the diagram of FIG. 2 for such a one-digit store with an input control circuit (*e*).

Since each one of the cores has a substantially rectangular hysteresis loop, it presents two stable magnetic conditions, one of which is a positive or P remanent induction condition and the other one of which is a negative or N remanent induction condition. It is known that such a magnetic core may be controlled for changing-over the magnetic stable condition thereof from P to N or from N to P, as the case may be, from the flow of a suitable current through the windings on the core. According to a previously known arrangement, it may be assumed that the control is made from a voltage of alternating character (for instance a voltage of sine waveform, though this waveform may as well be a trapezoidal, saw-toothed or rectangular one) applied to the interconnecting networks with a relative phase reversal in successive networks along the cascade. Each network comprises, as shown in the drawing, an output winding of a magnetic core and an input winding of the next following core serially connected through a unidirectionally conducting element such as a diode D and preferably, though not necessarily, a series resistor R is included in the circuit for the damping of stray oscillation during the operation of the stages.

For the purpose of the description, it will further be assumed that a magnetic core controlled for a read-in operation by phase (1) of the supply and read-out in phase (2) of the supply records the digital value 1 when the core is brought to the P magnetic condition by the read-in phase and brought back to the N magnetic condition by the read-out phase, and records the digital value 0 when it remains at the N magnetic condition in both these phases; and it will be conversely assumed that a magnetic core controlled for a read-in operation by the phase (2) of the supply and read-out in phase (1) records the digital value 1 when it remains in the N magnetic condition during both the read-in and read-out phases, and records the digital value 0 when it is brought to the P condition during a read-in phase and back to the N condition during a read-out phase of the supply.

When no decision pulse issues from BDS, the phase (1) of the supply finds the first and third cores M and M'' at their P condition and brings back these cores to their N condition; the second core M' was at N and remains at N. The current flowing through the network (III) is restricted to the coercitive value of the third core M'', changing-over from its P to its N condition. The phase (2) of the supply then brings the first and third cores M and M'' to their P condition; and so forth.

When a decision pulse issues from the system BDS, it leaves the first magnetic core M in the N condition; at the following useful alternation of phase (1) of the supply, the second magnetic core M' changes to P so that at the next following useful alternation of the phase (2) of the supply the third core M'' is maintained at N so that at the next following alternation of the phase (2) of the output current in the network (III) will be at the higher value thereof, whereas it was steadily at the restricted or lower value before this decision pulse from 1.

However, the output current will only be at the higher value during a single alternation of the supply and it is that temporary change in the output current which must be used for controlling the activation of the load L with a continuous current until some kind of reset signal is received.

Figure 2:
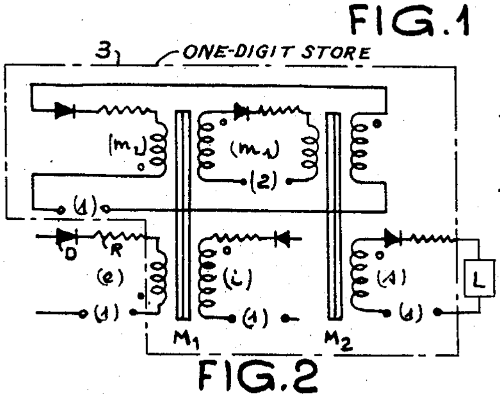
FIG. 2 shows a circuit arrangement of a one-digit store for such a processing system.

First, the output signal of network (III) will be applied to the activation of a one-digit store such as the one shown in FIG. 2. This store is made of two magnetic core stages $M_1$ and $M_2$ which are interconnected by two interconnecting networks, one of them ($m_1$) including the output winding of core $M_1$ and the input winding of core $M_2$ and being activated in phase (2) of the supply, the other one including the output winding of core $M_2$ and the input winding of core $M_1$ and being activated in phase (1) of the supply. This second interconnecting network is marked ($m_2$) and obviously it is a feedback network. The control of activation of the store is effected through an input network ($e$) which, as said, is controlled by the network (III) of FIG. 1, and the deactivation of the store may be effected for instance by a network (1) connected to a winding on core $M_1$ and being activable in phase (2) for inhibiting a change-over of magnetic conditions in the core $M_1$. The content of the store may be read from a read-out network ($s$) connected for instance to a winding on the core $M_2$.

The operation of this store may be explained as follows: in the "cleared" condition of the store, the core $M_1$ is first brought to N, in phase (1), so that in the following alternation of phase (2) the core $M_2$ which was at N is brought to P and, in the next following alternation of phase (1) is brought back to N which leaves the core $M_1$ in the N condition thereof; and so forth. In this cleared or zero condition, the output signal from the store, as taken from the circuit ($s$) is a current of restricted value. If the output were taken from a circuit connected to a winding on the first core $M_1$ of the store, this zero signal would, on the other hand, be a current of higher or unrestricted value.

When a digital value 1 is applied to the store by means of a high value current in the network ($e$) in phase (1), the core $M_1$ will be brought to P, whereas the core $M_2$ is brought back to N. In the following useful alternation of phase (2), the magnetic core $M_1$ changes over to N and the core $M_2$ will remain at N. At the following alternation of phase (1), the core $M_2$ remains at N while the core $M_1$ is brought to P; and so forth. During the time of activation of the store, the current in the output network ($s$) will be at the higher value thereof. Obviously, an output signal taken from the core $M_1$ would be at the lower value.

Figure 4:
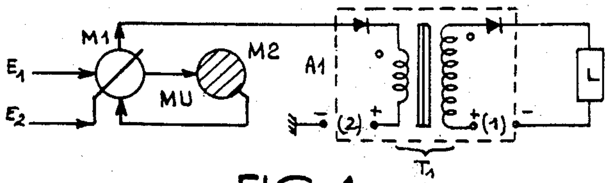
FIGS. 4 to 6 show three alternative embodiments of an output arrangement made in accordance with the invention and for the purposes herein above defined.
Figure 5:
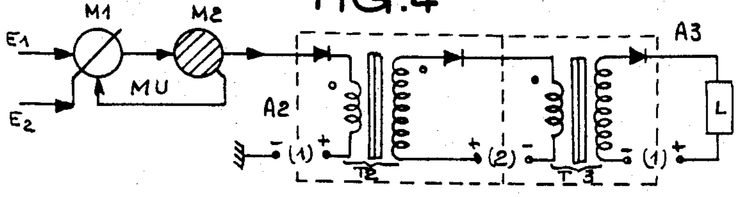
Figure 6:
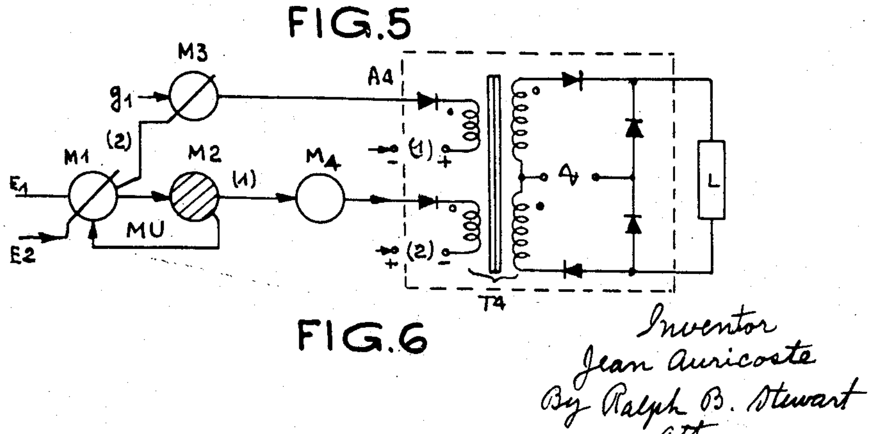

In an arrangement according to the invention, such a one-digit store forms part of the converter 3 of FIG. 1, details of this converter being disclosed in either one of the FIGS. 4 to 6 according to three alternative embodiments thereof. The said one-digit store is shown as MU in a symbolized diagram plainly understandable with respect to FIG. 2. The activation input is denoted $E_1$, the inhibition or clearance input by $E_2$. The inhibiting or clearing signal $E_2$ will of course come from the data processing system, when this system requires such an erasement of the store, and of course through an end cascade of magnetic core stages such as herein-before shown and described for the activation signal $E_1$.

The one-digit store MU controls a magnetic amplifier A1 for the supply of the load L with a continuous alternating current. In the simpler form of the invention, FIG. 4, this amplifier A1 actually comprises a transformer $T_1$ the magnetic core of which is of a material having a substantially rectangular hysteresis loop and the primary winding of this transformer is supplied with the read-out current from the core $M_1$ of the one-digit store MU. The load L is serially connected to the secondary winding of this transformer $T_1$. The operation may be explained as follows:

When the core of the transformer $T_1$ is brought to the P magnetic condition thereof during each useful alternation of the phase (2) of the supply, which is the case when the one-digit store is cleared, the useful alternations of the phase (1) of the supply will bring it back to the N magnetic condition and consequently only the coercitive value of current will be transmitted to the load L, this current being of low value and is unable to activate this load.

When on the other hand the core of the transformer $T_1$ is brought to N condition during each useful alternation of the phase (2) of the supply, which is the case when the one-digit store is activated by an output pulse issuing from the processing system, the useful alternations of the phase (1) of the supply will be applied with their full amplitude value of current to the load L which will then be activated as long as such a condition is maintained in the one-digit store.

The amplification factor obviously is dependent upon a suitable ratio of the primary and secondary turns on the core of the transformer $T_1$. When this amplification factor is not sufficient, two magnetic amplifier stages may be used, as shown in the diagram of FIG. 5, but, of course, in such a case, the control of the amplifier from the one-digit store MU must be from an output on the second core $M_2$ of this store. Otherwise stated, an intermediate magnetic amplifier A2 is inserted between the control output of the store MU and the magnetic amplifier A3 the output of which drives the load L. Both transformers T2 and T3 in these amplifiers are made of a material having a substantially rectangular hysteresis loop. The operation of the arrangement of FIG. 5 is obvious from what has been previously said with respect to the operations of FIGS. 1 to 4 of the drawings.

Of course, these ararngements of FIGS. 4 and 5 can only supply unidirectional current to the load. When it is desired to supply this load with a current obtained by full-wave rectification of an alternating current, one may use the modification shown in FIG. 6 which shows an appropriate magnetic amplifier A4 for this purpose. In this amplifier, the magnetic core T4 of substantially rectangular hysteresis loop material is provided with two input windings separately fed with the phases (1) and (2) of the supply, and the two secondary windings are fed by an A.C. source which will be rectified in two rectifying circuits as shown for feeding the load with a current obtained by a full-wave rectification of the current from this source. The rectification circuit is of quite a conventional kind and does not necessitate any further description. The control of this amplifier A4 is accomplished in part by an arrangement of a magnetic core stage which is fully disclosed in FIG. 3 of the drawings.

Figure 3:
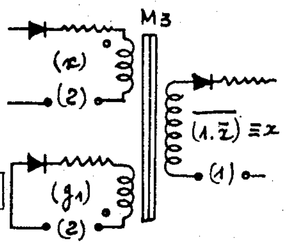
FIG. 3 shows a special magnetic core stage which is used in an arrangement according to the invention.

In this FIG. 3, a magnetic core M3 identical with the cores of the preceding figures is provided with two input windings so arranged as to control the magnetic condition of the core in opposite directions of action. One of the said input windings permanently receives a high current, digital value 1, from a network generating these digits from the phase (2) of the supply and shown at $g_1$ as being of identical diagram as the other interconnection networks but for the omission therein of an output winding of a magnetic core. It acts for bringing the core M3 to the P condition at each useful alternation of phase (2) of the supply. The other input winding of M3 acts as an inhibiting winding when it receives a high current from the read-out winding of a former stage (not shown). Denoting $x$ the signal carried by the said inhibition input, the logical operation performed by such a stage is $(1.\overline{x})=x$. This means that each time the actual digital value of $x$ is 1, the output signal from M3 represents the digital value 1 and not the complementary value 0 as in a stage such as described for the preceding diagrams. It is obvious that, when the input $x$ current is high, the action of the current through $g_1$ is inhibited and the magnetic core M3 remains at the N condition, whereas when the said input $x$ is a low current, the action of $g_1$ is not inhibited.

The control of the magnetic amplifier A4 of FIG. 6 includes such a magnetic stage as M3 inserted between the output of the core $M_1$ of the store MU and one of the input windings of the amplifier, activated in phase (1) of the supply. It also includes a control of the other input winding of the amplifier A4 by a magnetic core stage $M_4$ inserted between the output of the core $M_2$ of the store MU and the said other input winding, activated in phase (2). It is obvious that both controls acts in the same direction on the magnetic circuit of the amplifier so that, and with respect of the above description of FIGS. 1 to 3, when the one-digit store is cleared both parts of the magnetic circuit T4 are brought to the P condition, so that by the opposed action of the alternating supply of the secondary winding, no substantial current reaches the load, whereas when the one-digit store is activated, both parts of T4 are maintained in the N condition and the action of the supply of the secondary winding, of same direction, ensures the feeding of the load with the activating current thereof.

The described arrangement may be applied, as apparent for the engineer, when a three-phase supply is used instead of a two-phase supply, each digit then requiring three magnetic cores instead of two. The one-digit store will include a loop of two stages from which is derived the control of the amplifier.

I claim:

1. A data processing system output device for feeding continuous current to a load under the control of any single output pulse from the computer part of the system, comprising a two-core one-digit store, means feeding said pulse to said store through a cascade of magnetic-core stages, a magnetic amplifier controlled by said store and comprising at least one saturable-core transformer of substantially rectangular hysteresis loop the condition of which is controlled from the condition of the said one-digit store, said transformer having a secondary winding for feeding current to said load device, a source of alternating current, and a rectifier connected in series with said secondary winding and said load device.

2. A system for controlling the feed of continuous current to a load device in response to a single current pulse of a binary data processing system using saturable magnetic cores of substantially rectangular hysteresis loop, said system comprising: a magnetic amplifier including input and output circuits; a load device; a rectifier; a source of alternating current connected in series with said output circuit, said rectifier and said load device; and a two-stage one-digit magnetic store including an activation input circuit, and an inhibition input circuit, and an output circuit, said store having its output circuit connected to sad magnetic amplifier input circuit and having its activation and inhibition input circuit being supplied by the binary data processing system.

3. A system using saturable magnetic cores of substantially rectangular hysteresis loop for controlling the feed of continuous current to a load device in response to a single current pulse of a binary data processing system comprising: a magnetic amplifier including a pair of input windings and an output circuit; a load device; a rectifier; a source of alternating current connected in series with said output circuit, said rectifier and said load device; a two-stage one-digit magnetic store including an activation input circuit, an inhibition input circuit, and an output circuit, first and second magnetic core stages; means connecting the output circuit of said one-digit magnetic store to one of said input windings through said first magnetic core stage; and means connecting the output circuit of said one digit magnetic store to the other of said input windings through said second magnetic core stage; said store having its activation and inhibition input circuit supplied by the binary data processing system.

References Cited in the file of this patent

UNITED STATES PATENTS

| | | |
|---|---|---|
| Re. 24,949 | Avery | June 24, 1958 |
| 2,770,737 | Ramey | Nov. 13, 1956 |
| 2,857,586 | Wylen | Oct. 21, 1958 |
| 2,887,675 | Lo et al. | May 19, 1959 |
| 2,918,664 | Bauer | Dec. 22, 1959 |